(12) United States Patent
Fontanesi et al.

(10) Patent No.: US 12,535,508 B2
(45) Date of Patent: Jan. 27, 2026

(54) CURRENT SENSOR, SYSTEM COMPRISING A CURRENT SENSOR AND METHOD FOR MEASURING A CURRENT TO BE MEASURED

(71) Applicant: Infineon Technologies AG, Neubiberg (DE)

(72) Inventors: Simone Fontanesi, Villach (AT); Jernej Pogacnik, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 195 days.

(21) Appl. No.: 18/353,408

(22) Filed: Jul. 17, 2023

(65) Prior Publication Data

US 2024/0019464 A1 Jan. 18, 2024

(30) Foreign Application Priority Data

Jul. 18, 2022 (DE) .......................... 102022117871.4

(51) Int. Cl.
*G01R 15/18* (2006.01)
*G01R 19/165* (2006.01)

(52) U.S. Cl.
CPC ....... *G01R 15/18* (2013.01); *G01R 19/16571* (2013.01)

(58) Field of Classification Search
CPC ....... H02M 1/0009; H02M 1/08; H02M 3/156
See application file for complete search history.

(56) References Cited

U.S. PATENT DOCUMENTS

| | | | | |
|---|---|---|---|---|
| 2010/0023283 | A1* | 1/2010 | Boutorabi | G01R 19/2513 702/60 |
| 2011/0279942 | A1* | 11/2011 | Bishop | G01R 15/183 361/93.6 |
| 2014/0354049 | A1* | 12/2014 | Rozman | H02H 3/08 307/24 |
| 2015/0185293 | A1* | 7/2015 | Milano | G01R 33/0023 324/252 |
| 2016/0087418 | A1* | 3/2016 | Koffler | H03K 17/122 361/101 |
| 2016/0087626 | A1* | 3/2016 | Kaeriyama | H03K 17/687 327/109 |

FOREIGN PATENT DOCUMENTS

| | | |
|---|---|---|
| AT | 510380 B1 | 11/2012 |
| CN | 204269715 U | 4/2015 |
| DE | 2656817 A1 | 6/1978 |

* cited by examiner

*Primary Examiner* — Huy Q Phan
*Assistant Examiner* — Temilade S Rhodes-Vivour
(74) *Attorney, Agent, or Firm* — Harrity & Harrity, LLP (57) ABSTRACT

A current sensor is provided. The current sensor includes an electromagnetic coil configured to output a voltage induced by a current to be measured. The current sensor further includes a transistor coupled to the electromagnetic coil. The transistor is configured to control an output voltage of the transistor based on the voltage. The output voltage is indicative of the current to be measured.

18 Claims, 6 Drawing Sheets

CURRENT SENSOR, SYSTEM COMPRISING A CURRENT SENSOR AND METHOD FOR MEASURING A CURRENT TO BE MEASURED

CROSS REFERENCE TO RELATED APPLICATION

This application claims priority to German Patent Application No. 102022117871.4 filed on Jul. 18, 2022, the content of which is incorporated by reference herein in its entirety.

TECHNICAL FIELD

The present disclosure relates to current sensing. Examples relate to a current sensor, a system comprising a current sensor and a method for measuring a current to be measured.

BACKGROUND

Conventional overcurrent detection may be space or energy consuming, complicated to integrate, unreliable or expensive. Hence, there may be a demand for an improved current sensing.

SUMMARY

The demand may be satisfied by the subject matter of the independent claims.

According to a first aspect, the present disclosure relates to a current sensor. The current sensor includes an electromagnetic coil configured to output a voltage induced by a current to be measured. The current sensor further includes a transistor coupled to the electromagnetic coil. The transistor is configured to control an output voltage of the transistor based on the voltage. The output voltage is indicative of the current to be measured.

According to a second aspect, the present disclosure relates to a system. The system includes a current sensor as described herein, and a current path configured to conduct the current to be measured.

According to a third aspect, the present disclosure relates to a method for measuring a current to be measured. The method includes outputting, by an electromagnetic coil, a voltage induced by the current to be measured. The method further includes controlling, by a transistor coupled to the electromagnetic coil, an output voltage of the transistor based on the voltage. The output voltage is indicative of the current to be measured.

BRIEF DESCRIPTION OF THE DRAWINGS

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these implementations described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
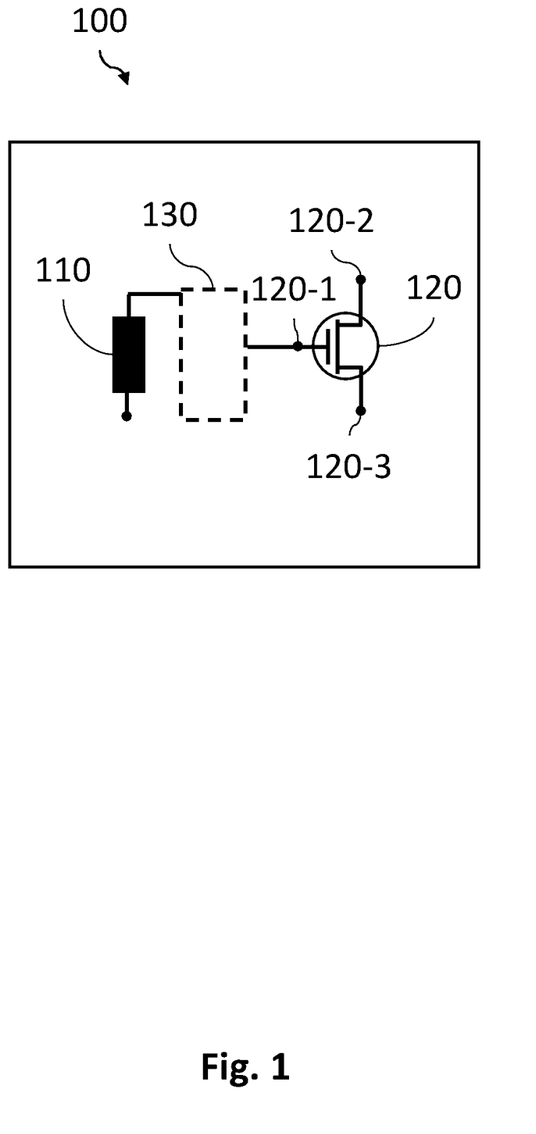
FIG. 1 illustrates an example of a current sensor.

FIG. 1 illustrates an example of a current sensor 100. The current sensor 100 comprises an electromagnetic coil 110. The electromagnetic coil 110 may be any type of inductive electrical component which is capable of transforming an electromagnetic field into a voltage based on electromagnetic induction, e.g., a ferromagnetic-core inductor, an air-core inductor or a variable (configurable) inductor. The electromagnetic coil 110 may, e.g., comprise a wound wire or stacks of metallic sheets. The electromagnetic coil 110 is indicated by a two-terminal electrical component in FIG. 1. In other examples, the electromagnetic coil 110 may exhibit any other number of terminals than shown in FIG. 1: the electromagnetic coil 110 may exhibit a number n≥2 of terminals.

The electromagnetic coil 110 is configured to output a voltage induced by a current to be measured. For instance, the electromagnetic coil 110 may output the voltage at one of its terminals, e.g., the electromagnetic coil 110 may exhibit a difference in potential between at least two of its terminals, yielding the voltage. The voltage may be induced based on a magnetic flux coupling with an external electrical component (current path) conducting the current to be measured, i.e., the electromagnetic coil 110 may be configured to output the voltage based on a magnetic field passing through the electromagnetic coil 110, wherein the magnetic field is caused by the current to be measured. For instance, the electromagnetic coil 110 may be configured to output the voltage based on a change in the magnetic field (e.g., a change in the magnetic flux of the magnetic field caused by a change in the current to be measured). The electromagnetic coil 110 may, e.g., be arranged in proximity to the external electrical component conducting the current such that the electromagnetic field at least partly passes the electromagnetic coil 110 with a sufficiently high field strength. Dimensions (in particular, an inductance) of the electromagnetic coil 110, the expected distance of the electromagnetic coil 110 to the external electrical component and the magnetic flux of the magnetic field may be aligned with each other such that the current sensor 100 achieves a desired sensitivity for current measurements.

The current to be measured may be any AC (alternating current) or DC (direct current). The voltage may result from the following Equation 1 according to Faraday's law of self-induction:

$$V_L = N\frac{d\phi}{dt} = \frac{\mu N^2 A di}{l dt} = M di/dt \qquad \text{Equation 1}$$

where $V_L$ is the voltage in volts; N is the number of turns of the electromagnetic coil 110 (e.g., of a wire of the electromagnetic coil 110); $\phi$ is an amount of magnetic flux in webers (caused by the current to be measured) which is linked to the electromagnetic coil 110 (the magnetic flux $\phi$ may be orientated in an opposite direction to a flow of the current to be measured); $\mu$ is the permeability of a core material of the electromagnetic coil 110 in henries per meter; A is the cross-sectional area of a core of the electromagnetic coil 110 in square meters; l is the length of the electromagnetic coil 110 in meters; di/dt is a change rate of a value i of the current to be measured in amperes per second; and where M aggregates time-invariant parameters of Equation 1 and is defined according to Equation 2 as follows:

$$M = \frac{\mu N^2 A}{l} \qquad \text{Equation 2}$$

The current sensor 100 further comprises a transistor 120. The transistor 120 may be any semiconductor component for controlling electrical voltages and currents. In FIG. 1, the transistor 120 is an n-channel MOSFET (metal-oxide-semiconductor field-effect transistor). In other examples, the transistor 120 may be of any other structure than the one shown in FIG. 1, e.g., the transistor 120 may be another field-effect transistor such as JFET (junction-gate field effect transistor), a junction transistor such as BJT (bipolar junction transistor), an IGBT (insulated-gate bipolar transistor), a thyristor or alike. The transistor 120 may be of any semiconductor material, e.g., a metalloid such as germanium or silicon, gallium arsenide, silicon carbide, or alike, and any dopant material. The transistor may exhibit any electrical polarity (positive or negative), e.g.,—other than shown in FIG. 1—p-channel in case of a field-effect transistor; npn or pnp in case of a BJT. In FIG. 1, the transistor 120 has three terminals 120-1, 120-2, 120-3 which represent gate, drain and source, respectively. In other examples, the transistor 120 may have a different number of terminals than the one of FIG. 1: The transistor 120 may have a number m≥3 of terminals.

The transistor 120 is coupled to the electromagnetic coil 110. In FIG. 1, the transistor 120 is coupled to the electromagnetic coil 110 via a coupling circuit 130 indicated as a two-pole. The coupling circuit 130 may comprise any electrical component suitable for coupling the transistor 120 to the electromagnetic coil 110, e.g., a conductive path connecting the two poles, a conductive path with further interposed electrical components or a transformer coupling the two poles. The coupling circuit 130 may couple the transistor 120 to the electromagnetic coil 110 such that the transistor 120 is electromagnetically influenced by the voltage, e.g., such that a voltage between terminals of the transistor 120 and/or a current conducting at a terminal of the transistor 120 change in dependence on the voltage.

The coupling circuit 130 is connected to one terminal of the electromagnetic coil 110 and to the terminal 120-1 of the transistor 120. It is to be noted that in other examples, the coupling circuit 130 may have a different number of poles (or ports) than shown in FIG. 1: The coupling circuit 130 may have a number l≥2 of poles. In other examples, the coupling circuit 130 may be connected differently to the electromagnetic coil 110 and/or the transistor 120 than shown in FIG. 1: For instance, the coupling circuit 130 may exhibit more than two poles which are connected with several terminals of the electromagnetic coil 110, respectively, and/or with several terminals of the transistor 120, respectively. Other than in FIG. 1, the coupling circuit 130 may, alternatively or additionally to the connection to the terminal 120-1, be connected to a different terminal of the transistor 120 such as terminal 120-3.

The transistor 120 is configured to control an output voltage of the transistor 120 based on the voltage. The output voltage is indicative of the current to be measured. For instance, the electromagnetic coil 110, the transistor 120 and the coupling circuit 130 may be configured such that a value of the output voltage has a known relation to the voltage and, thus, to the current to be measured, e.g., the output voltage may have a proportional relation or a discrete relation to the voltage.

The output voltage may be a voltage at one of the terminals of the transistor, e.g., a voltage between the terminal 120-2 and 120-3 of the transistor 120. The transistor 120 may control the output voltage, e.g., by switching the transistor 120 (i.e., switching between conductivity or isolation between the terminals 120-2 and 120-3) based on the voltage or by changing the resistivity between the terminals 120-2 and 120-3, thus, changing an amount of current flowing between the terminals based on the voltage. For instance, the coupling circuit 130 may output a control voltage at the terminal 120-1 of the transistor 120 based on the voltage (e.g., the control voltage may be a gate source voltage of the transistor 120). The transistor 120 may be configured to control the output voltage based on the control voltage. For instance, the electromagnetic coil 110, the transistor 120 and the coupling circuit 130 may be configured such that the control voltage falls below or exceeds a threshold voltage of the transistor 120 in dependence on the voltage, e.g., when the voltage falls below or exceeds a certain value.

Figure 2A:
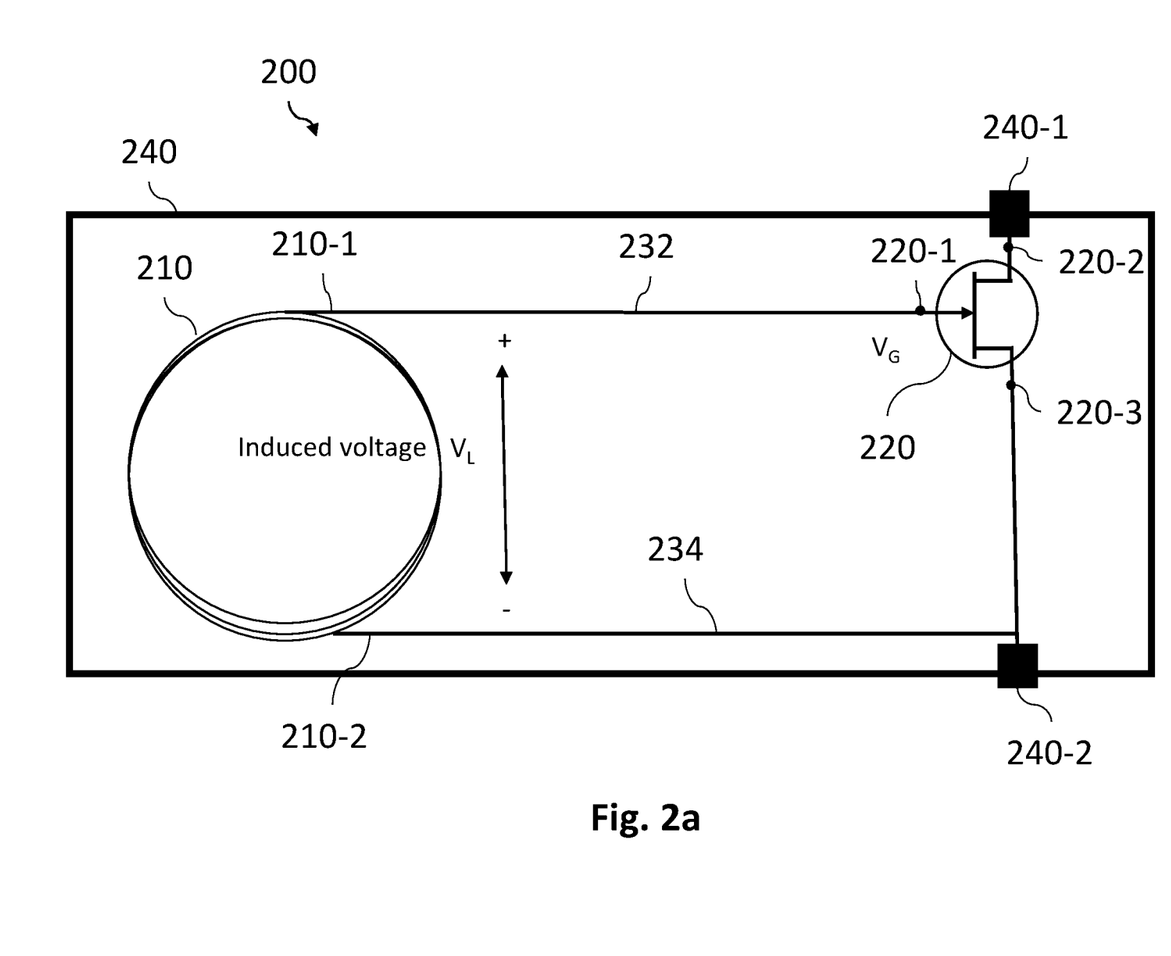
FIG. 2a, FIG. 2b illustrate further examples of a current sensor.

In some examples, the output voltage is indicative of a change rate of a value of the current, which is explained further with reference to FIG. 2a. In other examples, the output voltage is indicative of a difference between a value of the current and a predefined value, which is explained further with reference to FIG. 2b. For example, the current sensor 100 may comprise an RC circuit coupled to the electromagnetic coil 110 and the transistor 120. The RC circuit may be configured to output a control voltage at a terminal (e.g., the terminal 120-1) of the transistor 120 based on the voltage. The transistor 120 may be configured to control the output voltage based on the control voltage. For example, the control voltage may exceed a threshold voltage of the transistor 120 when the value of the current exceeds a further predefined value. For instance, exceeding the predefined value may indicate an overcurrent in the external electrical component conducting the current.

The current sensor 100 may provide a simplified, thus, low-cost current sensing. Further, the current sensor 100 may enable a fast current sensing, e.g., suitable for over-current detection, in particular, fast over-current detection as needed for eFuse technology.

In some examples, the current sensor 100 exclusively comprises passive electrical elements (devices, components), i.e., the current sensor 100 would not consume any (additional) electrical power. Passive electrical elements may be electrical elements which are configured to operate without an additional power source. Passive electrical elements may be electrical elements which are configured to operate without using a power source other than the current to be measured. By contrast, active electrical elements may be electrical elements which are configured to use an additional power source to control or modify electrical signals. The exclusively passive design of the current sensor 100 may enable a use in ultra low power applications.

In some examples, the current sensor 100 further comprises a monolithic integrated circuit. The monolithic integrated circuit may comprise the transistor 120 and the electromagnetic coil 110. For instance, the transistor 120 and the electromagnetic coil 110 may be integrated into a small flat piece (chip) of semiconductor material, yielding the monolithic integrated circuit. This may enable miniaturization and cost-efficient mass production of the current sensor 100. In some examples, a package of the monolithic integrated circuit exhibits at most two electrical contacts for electrically contacting the monolithic integrated circuit from outside the package. The electrical contacts may be, e.g., pins or leads, flat pads, solder balls, or metallic terminations. The at most two electrical contacts may enable the current sensor 100 to save space in space-limited application and decrease a complexity of integration of the current sensor 100.

In the case of a monolithic integrated circuit, a package of the monolithic integrated circuit may, in some examples, exhibit a first electrical contact and a second electrical contact for electrically contacting the monolithic integrated circuit from outside the package. The first electrical contact may be coupled to a first terminal (e.g., the terminal 120-1) of the transistor 120 and configured to receive an electrical reference potential (e.g., a ground potential). The second electrical contact may be coupled to a second terminal of the transistor (e.g., the terminal 120-2 or 120-3) and configured to output an electrical signal indicating the output voltage. In this manner, the current sensor 100 may get by with solely two pins and provide a simple configuration for, e.g., over-current detection.

Figure 2B:
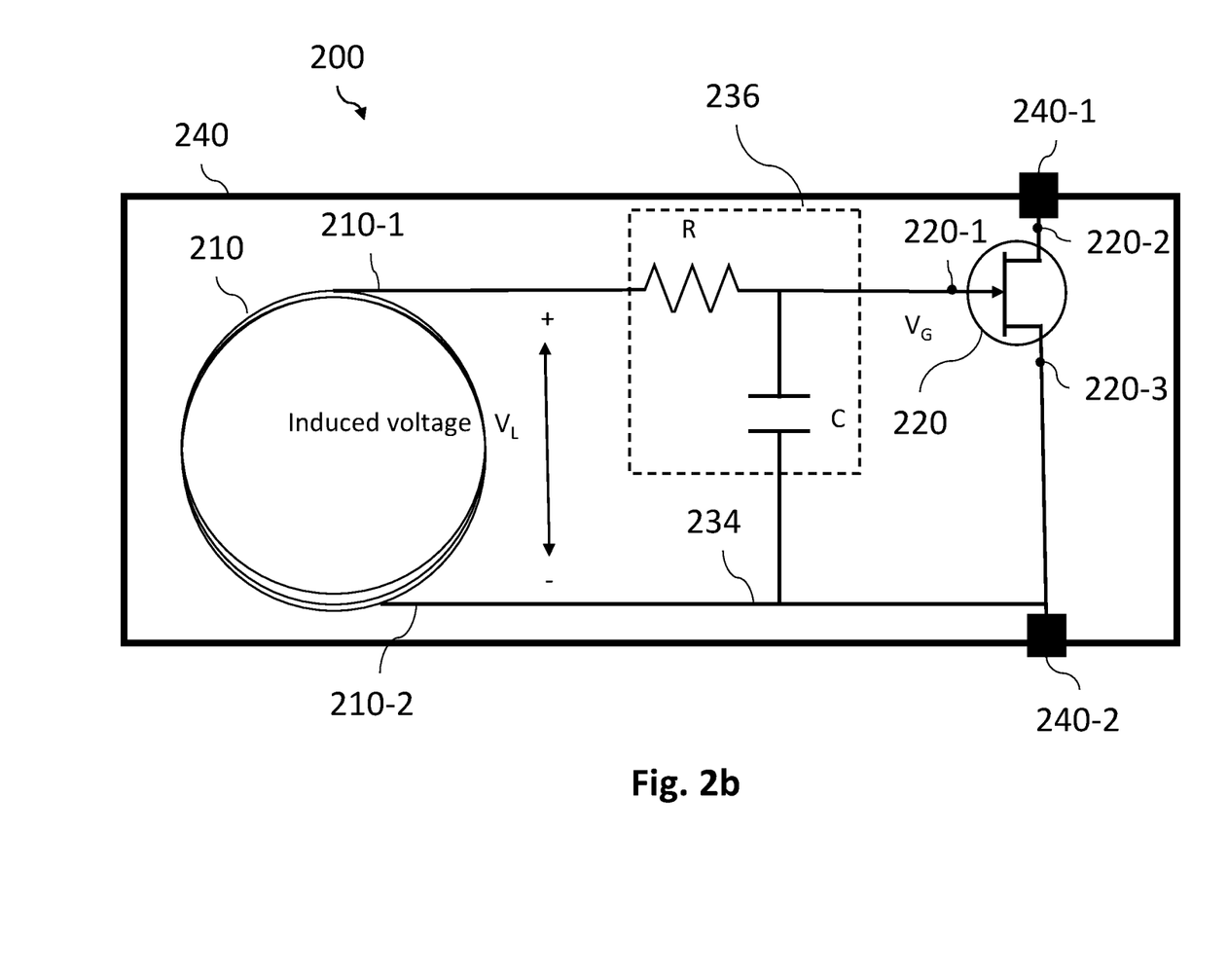

FIG. 2a and FIG. 2b illustrate two examples of a current sensor 200, e.g., for sensing a change rate of a value of a current to be measured (di/dt detection) and a difference between a value of the current to be measured and pre-defined value (delta i detection), respectively. The current sensor 200 comprises an electromagnetic coil 210 configured to output a voltage $V_L$ induced by a current to be measured. The electromagnetic coil 210 outputs the voltage $V_L$ as potential difference between its terminals 210-1, 210-2. In FIG. 2a and FIG. 2b, the potential difference is indicated by an arrow between a plus pole at the upper terminal 210-1 of the electromagnetic coil 210 and a minus pole at the lower terminal 210-2 of the electromagnetic coil 210. In other examples, the poles may be reversed compared to the poles shown in FIG. 2a and FIG. 2b.

The current sensor 200 further comprises a transistor 220 coupled to the electromagnetic coil 210. In FIG. 2a and FIG. 2b, the transistor 220 is an n-channel JFET. In other examples, the transistor 220 may be of any other type than the one indicated by FIG. 2a and FIG. 2b, e.g., a MOSFET or BJT. The transistor 220 has three terminals 220-1, 220-2, 220-3: The terminal 220-1 is the gate of the transistor 220; the terminal 220-2 is the source of the transistor 220; the terminal 220-3 is the drain of the transistor 220.

In FIG. 2a, the terminal 220-1 of the transistor 220 is connected via a conductive path 232 to the upper terminal 210-1 of the electromagnetic coil 210. In FIG. 2b, the current sensor 200 further comprises an RC circuit 236 coupled to the electromagnetic coil 210 and the transistor 220. In particular, the RC circuit comprises a resistor R with two terminals and a capacitor C with two terminals: the terminals of the resistor R are connected with the upper terminal 210-1 of the electromagnetic coil 210 and with the terminal 220-1 of the transistor 220, respectively, i.e., the resistor R is connected in series with the electromagnetic coil 210. The terminals of the capacitor C are connected with the terminal 220-1 of the transistor 220 and the terminal 220-3 of the transistor 220, respectively, i.e., the capacitor C is connected in parallel with the transistor 220. In both FIG. 2a and FIG. 2b, the terminal 220-3 of the transistor 220 is connected via a conductive path 234 to the lower terminal 210-2 of the electromagnetic coil 210.

The transistor 220 is configured to control an output voltage of the transistor 220 based on the voltage $V_L$, wherein the output voltage is indicative of the current to be measured. The output voltage may be between the terminal 220-2 and the terminal 220-3. The transistor 220 may control the output voltage based on a control voltage $V_G$ (gate-source voltage) between the terminal 220-1 and the terminal 220-3 of the transistor 220. In the configuration of the current sensor 200 shown in FIG. 2a, the conductive paths 232, 234 are configured to output the control voltage $V_G$. In the latter case, the control voltage $V_G$ may exceed a threshold voltage of the transistor 220 when the change rate of the value of the current (to be measured) exceeds a predefined value, e.g., indicating an overcurrent or short circuit in the external electrical component conducting the current to be measured. In the configuration of the current sensor 200 shown in FIG. 2b, the RC circuit 236 is configured to output the control voltage $V_G$ at the terminals 220-1, 220-3 of the transistor 220 based on the voltage $V_L$. In the latter case, the control voltage $V_G$ may exceed a threshold voltage of the transistor 220 when the value of the current (to be measured) exceeds a further predefined value, e.g., indicating an overcurrent of the current to be measured.

The current sensor 200 may further comprise an optional monolithic integrated circuit 240 comprising the transistor 220 and the electromagnetic coil 210. A package of the monolithic integrated circuit 230 exhibits a first electrical contact 240-1 and a second electrical contact 240-2 for electrically contacting the monolithic integrated circuit 240 from outside the package. The first electrical contact 240-1 is coupled to the terminal 220-3 (first terminal) of the transistor 220. The first electrical contact 240-1 may be configured to receive an electrical reference potential. The second electrical contact 240-2 is coupled to the terminal 220-2 (second terminal) of the transistor 220. The second electrical contact 240-2 may be configured to output an electrical signal indicating the output voltage.

In the configuration of the current sensor 200 shown in FIG. 2*a*, the output voltage may be indicative of a change rate of a value of the current (to be measured). In the latter case, the control voltage $V_G$ may have a mathematical relation to the current as shown in Equation 3:

$$V_G = M \frac{di}{dt} \qquad \text{Equation 3}$$

If the condition of $V_G \geq V_{th}$ (threshold voltage of the transistor 220), thus, $di/dt \geq V_{th}/M$ is fulfilled for Equation 3, the transistor 220 may switch.

In the configuration of the current sensor 200 shown in FIG. 2*b*, the output voltage may be indicative of a difference between a value of the current and a predefined value (e.g., the predefined value may be a nominal value of the current to be measured). In the latter case, the control voltage $V_G$ may have a mathematical relation to the current as shown in Equation 4:

$$V_G = V_C = \frac{1}{RC} \int_{t_0}^{t} V_L dt = \qquad \text{Equation 4}$$

$$\frac{1}{RC} \int_{t_0}^{t} M \frac{di}{dt} = \frac{M}{RC} \int_{I_0}^{t} di = \frac{M}{RC} (i - I_0) = M \frac{\Delta I}{RC}$$

where R is the resistivity of the resistor of the RC circuit 236; C is the capacitance of the capacitor of the RC circuit 236; i is the value of current to be measured; $I_0$ is the predefined value; $\Delta I$ (delta i) is the difference between the value of the current I and the predefined value $I_0$.

If the condition of $V_G \geq V_{th}$, thus, $\Delta I \geq RC\, V_{th}/M$ is fulfilled for Equation 4, the transistor 220 may switch. For instance, electrical components of the current sensor 200 may be selected such that $RC\, V_{th}/M$ is the further predefined value ($I_{off}$), e.g., an overcurrent value.

The switching of the transistor 220 may result in a change of the output voltage. For instance, the second electrical contact 240-2 may be connected to a predefined electrical potential (e.g., to a drain voltage $V_{DD}$). In case, the transistor 220 switches, the output voltage may change from the reference voltage to the predefined electrical potential or vice versa. Using circuit design for the configuration shown in FIG. 2*a* and FIG. 2*b*, $V_G$ may be scaled to fit with di/dt or delta i requirements of the application of the current sensor 200, respectively, e.g., such that an on- or off-state of the transistor 220 indicates an overcurrent of the current to be measured.

The current sensor 200 may provide a simplified, low-cost, and fast current sensing. Moreover, the current sensor 200 may be operated passively, thus, without an additional source which may be relevant for low power applications.

Figure 3:
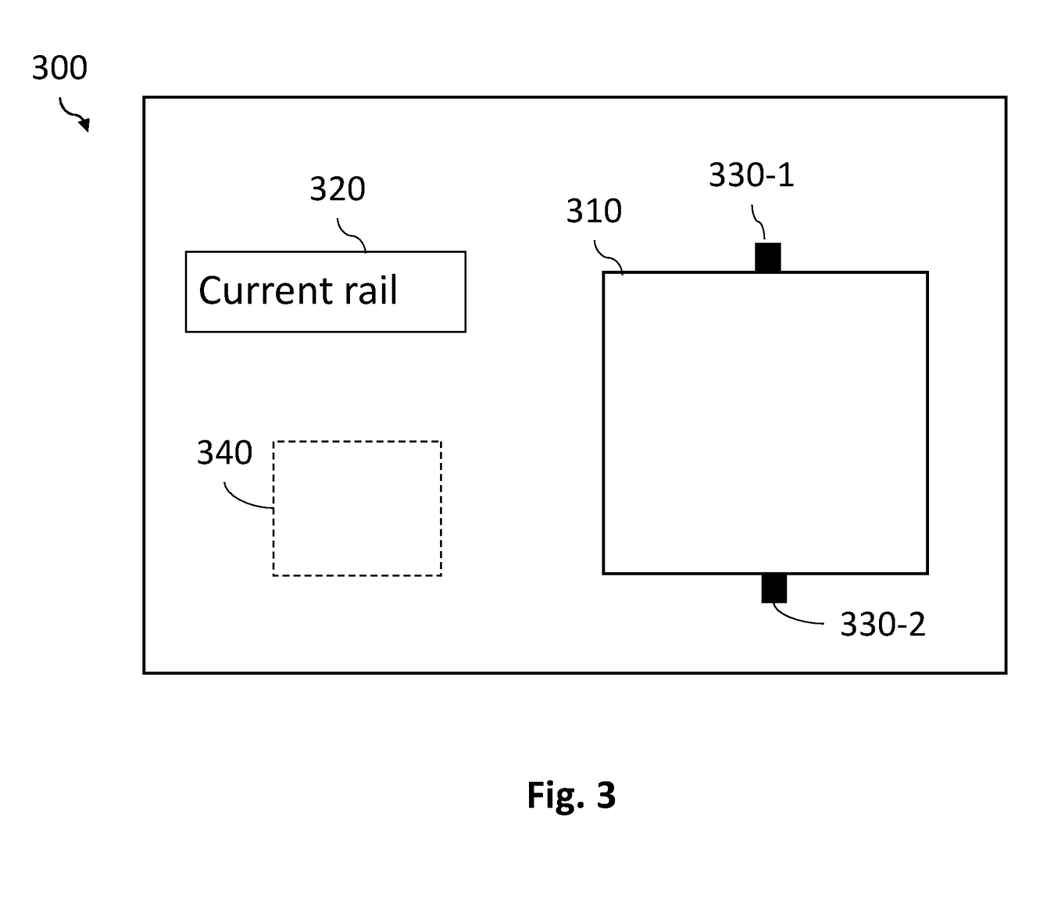
FIG. 3 illustrates an example of a system comprising a current sensor.

FIG. 3 illustrates an example of a system 300 comprising a current sensor 310 as described herein such as current sensor 100 or 200. The system 300 further comprises a current path (current rail) 320 configured to conduct the current to be measured. The current path 320 may be, e.g., a conductive trace/track on a PCB (printed circuit board) or a busbar.

It is to be noted that the shape of the current path 320, the shape of the current sensor 310 and the arrangement of the current path 320 relative to the current sensor 310 shown in FIG. 3 is meant for illustrative purposes only. In other examples, the shape of the current path 320 and/or the shape of the current sensor 310 may differ from the one shown in FIG. 3, e.g., the current path 320 may have an irregular shape. Further, the current path 320 may be arranged differently than shown in FIG. 3, e.g., the current path 320 may be partly arranged in a layer below the current sensor 320.

In some examples, the current sensor 310 is galvanically isolated from the current path 320. This may increase safety and reliability of the system 300 since interference or short circuit currents are not transferred from the current sensor 310 to the current path 320 or vice versa. As no complicated safety measures need to be implemented, the galvanic isolation may simplify the circuit design of the system 300.

In some examples, the system 300 comprises a PCB. The current path 320 may be formed in or on the PCB. The transistor and the electromagnetic coil of the current sensor 310 may be discrete electrical components mounted onto the PCB. The realization of the current sensor 310 with discrete electrical components may facilitate an adjustment of the current sensor 310 to the requirements of the system 300 and lower the cost of the system 300, in particular, for a smaller production volume of the system 300 or the current sensor 310. Alternatively, the current sensor 310 may be a monolithic integrated circuit as described above, e.g., with reference to FIG. 1, FIG. 2*a* and FIG. 2*b*.

The system 300 further comprises a first node 330-1 configured to output a first electrical potential (e.g., a reference potential) and a second node 330-2 configured to output a second electrical potential (e.g., a predefined potential such as a drain potential). A first terminal of the transistor of the current sensor 310 may be coupled to the first node 330-1 and a second terminal of the transistor of the current sensor 310 may be coupled to the second node 330-2. The transistor may be configured to selectively output the first electrical potential, or the second electrical potential based on the voltage induced by the current to be measured. Correspondingly, the output voltage may either (substantially) match the first electrical potential or the second electrical potential. For instance, a voltage between the first node 330-1 and the second node 330-2 may indicate the output voltage. Thus, the output voltage may be output or tapped at the nodes 330-1, 330-2, e.g., for overcurrent detection. The changing signals from the first to the second electrical potential or vice versa may indicate the exceed of a predefined value for the current to be measured. This configuration may provide a simple indication of relevant characteristics of the current to be measured, for example, for monitoring di/dt or delta i.

In some examples, the system 300 comprises a pullup resistor coupled between the first terminal and the first node 330-1 or the second terminal and the second node 330-2. This may be beneficial for a reliable bias of an electrical signal indicating the output voltage. For instance, the pullup resistor may prevent the electrical signal to falsely trigger an overcurrent detection.

The system 300 further comprises an optional control circuit 340. The control circuit 340 may be configured to receive the electrical signal indicating the output voltage. For instance, the control circuit 340 may be coupled with a conductive path coupling the first terminal and the first node 330-1 or the second terminal and the second node 330-2. The control circuit 340 may further be configured to control the current conducting through the current path 320 based on the electrical signal (indicating the output voltage). For instance, the control circuit 340 may, e.g., upon a detected overcurrent when monitoring the electrical signal, cut the current path 320 from a current source to decrease the current through the current path 320, e.g., to set the current to 0 amperes. This may enable a shutdown of the system 300 or of parts thereof to provide an overcurrent protection.

The system 300 may integrate the current sensor 310 for providing a simple, low-cost, and fast current sensing for low power applications.

Figure 4:
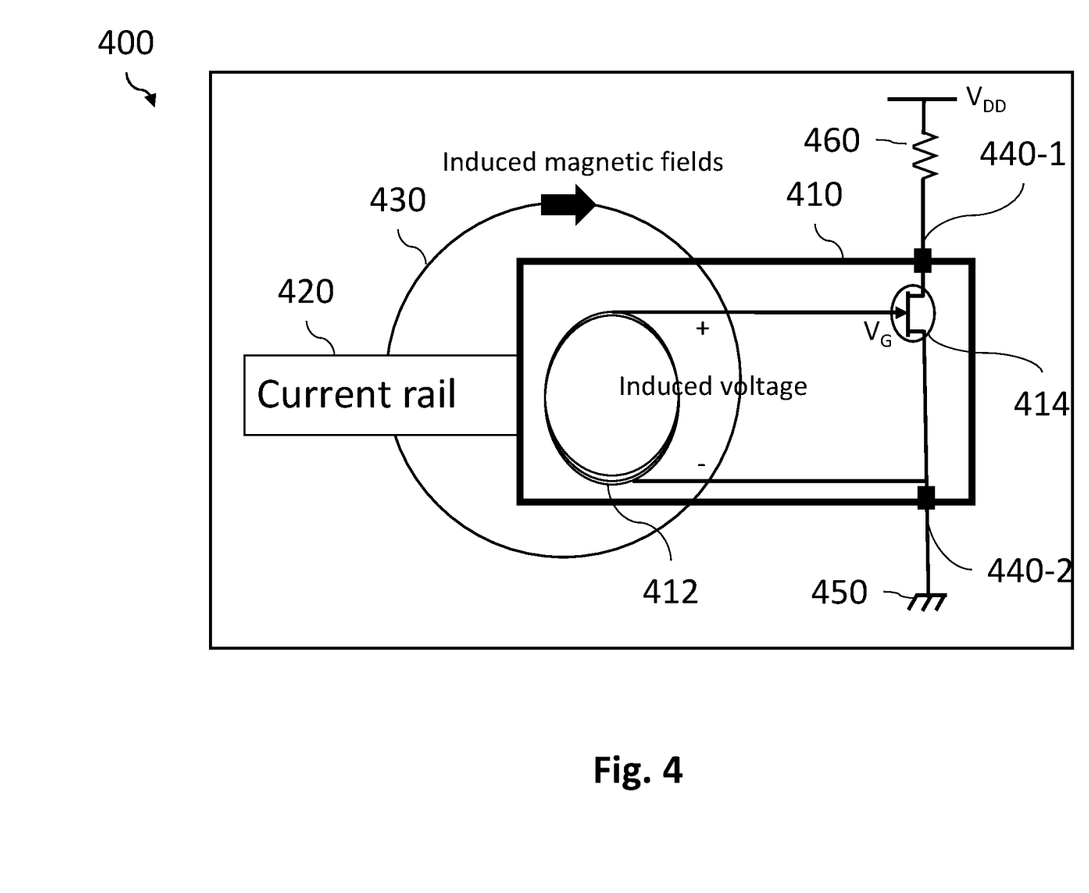
FIG. 4 illustrates another example of a system comprising a current sensor.

FIG. 4 illustrates another example of a system 400 comprising a current sensor 410 as described herein such as current sensor 100 or 200. The current sensor 410 comprises an electromagnetic coil 412 and a transistor 414. In FIG. 4, the current sensor 410 may exhibit the configuration of the current sensor 200 of FIG. 2a. In other examples, the current sensor 410 may exhibit a different configuration than the one shown in FIG. 4, e.g., the configuration of the current sensor 100 or the configuration of the current sensor 200 of FIG. 2b.

The system 400 further comprises a current path (current rail) 420 configured to conduct the current to be measured. The current induces a magnetic field 430 passing through a core of the electromagnetic coil 412 of the current sensor 410 and, thereby, causing the voltage at the terminals of the electromagnetic coil 412.

The system 400 further comprises a first node 440-1 configured to output a first electrical potential $V_{DD}$. The first electrical potential $V_{DD}$ may be a predefined drain voltage. The system 400 further comprises a second node 440-2 configured to output a second electrical potential 450. In FIG. 4, the second electrical potential 450 is a ground potential. A first terminal of the transistor 414, e.g., the drain terminal, is coupled to the first node 440-1 and a second terminal of the transistor 414, e.g., the source terminal, is coupled to the second node 440-2. The transistor 414 may be configured to selectively output the first electrical potential $V_{DD}$ or the second electrical potential 450 based on the voltage. The system 400 further comprises a pullup resistor 460 coupled between the first terminal and the first node 440-1.

The system 400 may integrate the current sensor 310 for providing a simple, low-cost, and fast current sensing for low power applications.

Figure 5:
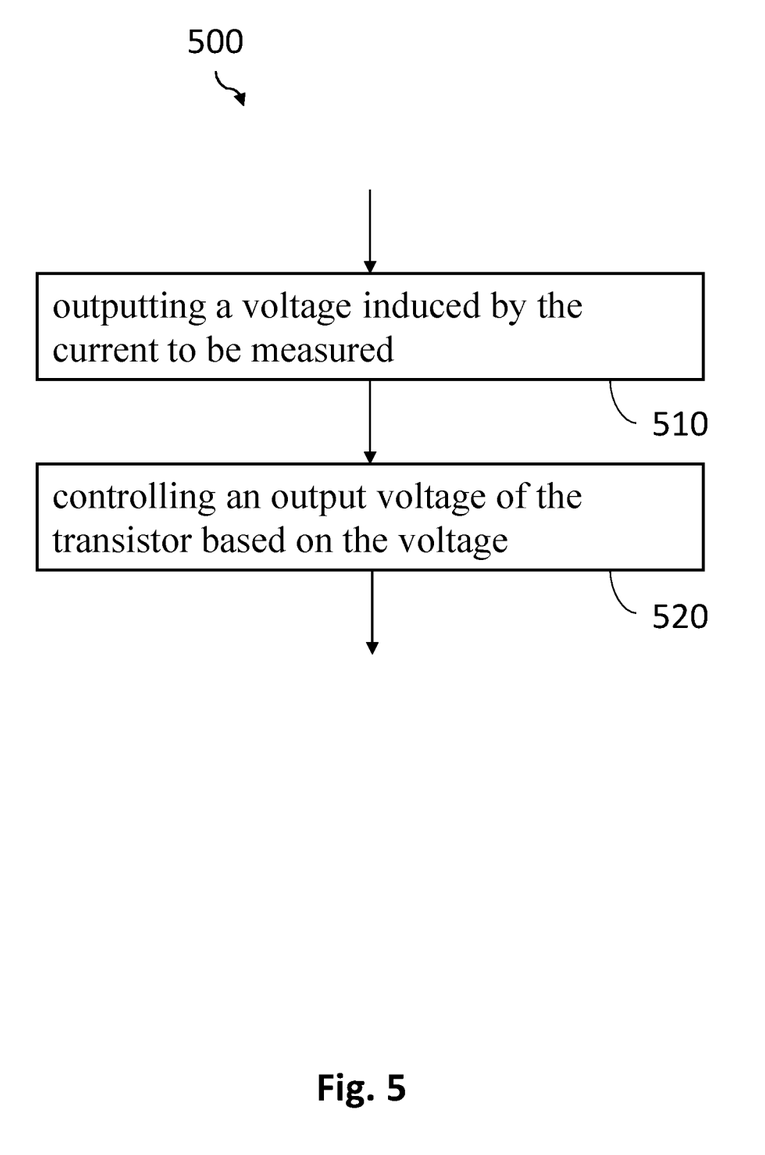
FIG. 5 illustrates a flowchart of an example of a method for measuring a current to be measured.

FIG. 5 illustrates a flowchart of an example of a method 500 for measuring a current to be measured. The method 500 comprises outputting 510, by an electromagnetic coil, a voltage induced by the current to be measured. The method 500 further comprises controlling 520, by a transistor coupled to the electromagnetic coil, an output voltage of the transistor based on the voltage. The output voltage is indicative of the current to be measured.

More details and aspects of the method 500 are explained in connection with the proposed technique or one or more examples described above, e.g., with reference to FIG. 1, FIG. 2a or FIG. 2b. The method 500 may comprise one or more additional optional features corresponding to one or more aspects of the proposed technique, or one or more examples described above.

The method 500 may provide a simple, low-cost, and fast current sensing for low power applications.

Conventionally, overcurrent detection may be implemented by mean of a shunt resistor, by measuring the current to be measured with a core-based or coreless magnetic sensor, by measuring the current with an inductive sensor, by using the dedicated overcurrent detection pins of magnetic sensors or by measuring the voltage on the line to detect short circuit conditions (a rapid voltage drop may indicate short circuits). Methods and apparatuses described herein may represent a more cost-effective, dynamic and easy-to-integrate alternative to these conventional overcurrent detection techniques. For instance, methods and apparatuses described herein propose a coil implemented into a chip. A voltage across the coil may be used to switch on (or off) a transistor (e.g., MOSFET) and pull-down an OCD (overcurrent detection) pin to signal an overcurrent detection event.

Methods and apparatuses described herein may provide a passive current sensor with no supply needed and a fast over current detection, e.g., for eFuse. Methods and apparatuses described herein may enable current sensing by an integrated circuit with only two pins. Methods and apparatuses described herein may be beneficial for (ultra) low power application, provide voltage isolation between the current sensor and a current path conducting the current to be measure. Methods and apparatuses described herein may decrease production and operating costs of current sensors.

The following examples pertain to further implementations:

Implementation (1) is a current sensor. The current sensor comprises an electromagnetic coil configured to output a voltage induced by a current to be measured. The current sensor further comprises a transistor coupled to the electromagnetic coil. The transistor is configured to control an output voltage of the transistor based on the voltage. The output voltage is indicative of the current to be measured.

Implementation (2) is the current sensor of implementation (1), wherein the current sensor exclusively comprises passive electrical elements.

Implementation (3) is the current sensor of any one of implementation (1) to (2), wherein the output voltage is indicative of a change rate of a value of the current.

Implementation (4) is the current sensor of any one of implementation (1) to (2), wherein the output voltage is indicative of a difference between a value of the current and a predefined value.

Implementation (5) is the current sensor of implementation (4), further comprising an RC circuit coupled to the electromagnetic coil and the transistor. The RC circuit is configured to output a control voltage at a terminal of the transistor based on the voltage. The transistor is configured to control the output voltage based on the control voltage.

Implementation (6) is the current sensor of implementation (5), wherein the control voltage exceeds a threshold voltage of the transistor when the value of the current exceeds a further predefined value.

Implementation (7) is the current sensor of any one of the implementations (1) to (6), further comprising a monolithic integrated circuit. The monolithic integrated circuit comprises the transistor and the electromagnetic coil.

Implementation (8) is the current sensor of implementation (7), wherein a package of the monolithic integrated circuit exhibits at most two electrical contacts for electrically contacting the monolithic integrated circuit from outside the package.

Implementation (9) is the current sensor of implementation (7) or (8), wherein a package of the monolithic integrated circuit exhibits a first electrical contact and a second electrical contact for electrically contacting the monolithic integrated circuit from outside the package. The first electrical contact is coupled to a first terminal of the transistor and configured to receive an electrical reference potential. The second electrical contact is coupled to a second terminal of the transistor and configured to output an electrical signal indicating the output voltage.

Implementation (10) is a system comprising a current sensor according to any one of implementations (1) to (9) and a current path configured to conduct the current to be measured.

Implementation (11) is the system of implementation (10), wherein the current sensor is galvanically isolated from the current path.

Implementation (12) is the system of implementation (10) or (11), further comprising a printed circuit board. The current sensor is the current sensor according to any one of implementations (1) to (6). The current path is formed in or on the printed circuit board. The transistor and the electromagnetic coil of the current sensor are discrete electrical components mounted onto the printed circuit board.

Implementation (13) is the system of any one of implementations (10) to (12), further comprising a first node configured to output a first electrical potential and a second node configured to output a second electrical potential. A first terminal of the transistor is coupled to the first node and a second terminal of the transistor is coupled to the second node. The transistor is configured to selectively output the first electrical potential or the second electrical potential based on the voltage.

Implementation (14) is the system of implementation (13), further comprising a pullup resistor coupled between the first terminal and the first node or the second terminal and the second node.

Implementation (15) is the system of any one of implementations (10) to (14), further comprising a control circuit configured to receive an electrical signal indicating the output voltage. The control circuit is further configured to control the current conducting through the current path based on the electrical signal.

Implementation (16) is the system of implementation (13) or (14), and implementation (15), wherein the control circuit is coupled with a conductive path coupling the first terminal and the first node or the second terminal and the second node.

Implementation (17) is a method for measuring a current to be measured. The method comprises outputting, by an electromagnetic coil, a voltage induced by the current to be measured and controlling, by a transistor coupled to the electromagnetic coil, an output voltage of the transistor based on the voltage. The output voltage is indicative of the current to be measured.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A current sensor, comprising:
    an electromagnetic coil configured to output a voltage induced by a current to be measured;
    a transistor coupled to the electromagnetic coil, wherein the transistor is configured to control an output voltage of the transistor based on the voltage induced by the current to be measured, wherein the output voltage is indicative of the current to be measured; and
    an RC circuit coupled to the electromagnetic coil and the transistor,
        wherein the RC circuit is configured to output a control voltage at a terminal of the transistor based on the voltage induced by the current to be measured,
        wherein the transistor is configured to control the output voltage based on the control voltage, and
        wherein the output voltage is indicative of a difference between a value of the current to be measured and a predefined value.

2. The current sensor of claim 1, wherein the current sensor exclusively comprises passive electrical elements.

3. The current sensor of claim 1, wherein the output voltage is indicative of a change rate of a value of the current to be measured.

4. The current sensor of claim 1, wherein the control voltage exceeds a threshold voltage of the transistor when the value of the current to be measured exceeds a further predefined value.

5. The current sensor of claim 1, further comprising:
    a monolithic integrated circuit, wherein the monolithic integrated circuit comprises the transistor and the electromagnetic coil.

6. The current sensor of claim 5, wherein a package of the monolithic integrated circuit exhibits at most two electrical contacts for electrically contacting the monolithic integrated circuit from outside the package.

7. The current sensor of claim 5, wherein a package of the monolithic integrated circuit exhibits a first electrical contact and a second electrical contact for electrically contacting the monolithic integrated circuit from outside the package,
    wherein the first electrical contact is coupled to a first terminal of the transistor and configured to receive an electrical reference potential, and
    wherein the second electrical contact is coupled to a second terminal of the transistor and configured to output an electrical signal indicating the output voltage.

8. The current sensor of claim 1, wherein the RC circuit is coupled between the electromagnetic coil and the terminal of the transistor.

9. The current sensor of claim 1, further comprising:
a first node configured to output a first electrical potential; and
a second node configured to output a second electrical potential,
wherein a first terminal of the transistor is coupled to the first node, and a second terminal of the transistor is coupled to the second node, and
wherein the transistor is configured to selectively output the first electrical potential or the second electrical potential based on the voltage induced by the current to be measured.

10. A system comprising:
a current sensor comprising:
an electromagnetic coil configured to output a voltage induced by a current to be measured; and
a transistor coupled to the electromagnetic coil, wherein the transistor includes a first terminal and a second terminal, and wherein the transistor is configured to control an output voltage of the transistor based on the voltage induced by the current to be measured;
a current path configured to conduct the current to be measured;
a first node configured to output a first electrical potential; and
a second node configured to output a second electrical potential,
wherein the first terminal of the transistor is coupled to the first node, and the second terminal of the transistor is coupled to the second node, and
wherein the transistor is configured to selectively output the first electrical potential or the second electrical potential based on the voltage induced by the current to be measured.

11. The system of claim 10, wherein the current sensor is galvanically isolated from the current path.

12. The system of claim 10, further comprising:
a printed circuit board,
wherein the current path is formed in or on the printed circuit board, and
wherein the transistor and the electromagnetic coil of the current sensor are discrete electrical components mounted onto the printed circuit board.

13. The system of claim 10, further comprising:
a pullup resistor coupled between the first terminal and the first node or the second terminal and the second node.

14. The system of claim 10, further comprising:
a control circuit configured to:
receive an electrical signal indicating the output voltage; and
control the current conducting through the current path based on the electrical signal.

15. The system of claim 14, wherein the control circuit is coupled with a conductive path coupling the first terminal and the first node or a conductive path coupling the second terminal and the second node.

16. A method for measuring a current to be measured, comprising:
outputting, by an electromagnetic coil, a voltage induced by the current to be measured; and
controlling, by a transistor coupled to the electromagnetic coil, an output voltage of the transistor based on the voltage induced by the current to be measured, wherein the output voltage is indicative of the current to be measured,
wherein controlling the output voltage of the transistor includes selectively outputting a first electrical potential output at a first node or a second electrical potential output at a second node based on the voltage induced by the current to be measured, and
wherein the transistor includes a first terminal coupled to the first node, and a second terminal coupled to the second node.

17. A current sensor, comprising:
an electromagnetic coil configured to output a voltage induced by a current to be measured;
a transistor coupled to the electromagnetic coil, wherein the transistor includes a first terminal and a second terminal, and wherein the transistor is configured to control an output voltage of the transistor based on the voltage induced by the current to be measured, wherein the output voltage is indicative of the current to be measured;
a first node configured to output a first electrical potential; and
a second node configured to output a second electrical potential,
wherein the first terminal of the transistor is coupled to the first node, and the second terminal of the transistor is coupled to the second node, and
wherein the transistor is configured to selectively output the first electrical potential or the second electrical potential based on the voltage induced by the current to be measured.

18. The current sensor of claim 17, further comprising:
a pullup resistor coupled between the first terminal and the first node or the second terminal and the second node.

\* \* \* \* \*